United States Patent [19]

Roumieu et al.

[11] Patent Number: 5,153,163
[45] Date of Patent: Oct. 6, 1992

[54] PROCESS FOR THE PRETREATMENT OF A CATALYST BY A MIXTURE OF A SULPHUR AGENT AND AN ORGANIC REDUCING AGENT

[75] Inventors: Raymond Roumieu, Valence; Jean-Paul Boitiaux, Poissy, both of France

[73] Assignee: Europeenne De Retraitement De Catalyseurs Eurecat, La Voulte Sur Rhone, France

[21] Appl. No.: 729,300

[22] Filed: Jul. 12, 1991

[30] Foreign Application Priority Data

Jul. 13, 1990 [FR] France ................ 90 09080

[51] Int. Cl.⁵ .............. B01J 33/00; B01J 37/20; B01J 27/04; B01J 27/043
[52] U.S. Cl. .................. 502/222; 502/216; 502/508
[58] Field of Search ............ 502/216, 219, 220, 222, 502/223, 508

[56] References Cited

U.S. PATENT DOCUMENTS

| | | | |
|---|---|---|---|
| 3,872,028 | 3/1975 | Rijnten et al. | 502/216 |
| 4,530,917 | 7/1985 | Berrebi | 502/220 |
| 4,719,195 | 1/1988 | Toulhoat et al. | 502/216 |
| 4,977,117 | 12/1990 | Berrebi et al. | 502/219 X |
| 5,017,535 | 5/1991 | Schoonhoven et al. | 502/220 X |
| 5,032,565 | 7/1991 | Berrebi | 502/331 |

FOREIGN PATENT DOCUMENTS 0352851 1/1990 European Pat. Off. ............ 502/216

*Primary Examiner*—W. J. Shine
*Assistant Examiner*—Douglas J. McGinty
*Attorney, Agent, or Firm*—Millen, White & Zelano

[57] ABSTRACT

The invention relates to a pretreatment of a petrochemical or refining catalyst containing at least one metal in metallic or metallic oxide form, deposited on a support.

The catalyst is impregnated by a solution or a suspension containing on the one hand a specific sulphur agent, e.g., diethanol disulfide and on the other an organic reducing agent, e.g., formic acid.

14 Claims, No Drawings

PROCESS FOR THE PRETREATMENT OF A CATALYST BY A MIXTURE OF A SULPHUR AGENT AND AN ORGANIC REDUCING AGENT

BACKGROUND OF THE INVENTION

In the field of refining and petrochemistry and, for example, in catalytic reforming or selective hydrogenation reactions with respect to petrol, it is sometimes appropriate to reduce the activity of the catalysts. An example is nickel catalysts, which are e.g. excellent hydrogenation catalysts for aromatics to such an extent that they can cause runaway reaction during the start-up with new or regenerated catalysts, which may even lead to start-up incidents and to the destruction of the reactor. It is therefore necessary to carry out passivation treatments making it possible to avoid a runaway reaction. These treatments generally consist of irreversibly poisoning by sulphur the most virulent active sites of the nickel existing on the new or regenerated catalyst.

Thus, with more particular regard to refining and hydrotreatment or hydrogenation catalysts based on iron, cobalt, molybdenum, tungsten or nickel, adequate catalysts are marketed and loaded into reactors in the form of oxides, whereas their activated and stable form is the metallic form. Thus, in the prior art, the first stage consisted of reducing the oxides in the metallic state in the reactor (in situ) with hydrogen and then, for obviating the aforementioned disadvantages, in a second stage, there is an in situ catalyst activity reduction by introducing a given quantity of sulphur, generally representing 0.1 to 1.2% by weight of sulphur, based on the catalyst weight. This is generally carried out with the aid of a sulphur-containing compound, such as carbon sulphide, mercaptan, hydrogen sulphide, thiophene compounds, sulphides and disulphides, e.g. dimethyl sulphide DMS or dimethyl disulphide DMDS. In these prior art processes, the reduction with hydrogen (first stage) is performed at a relatively high temperature for a relatively long time (e.g. for reducing nickel oxide to nickel, at approximately 400° C. for 14 hours).

SUMMARY OF THE INVENTION

The present invention makes it possible to improve the prior art procedures and to operate under simplified conditions, which are less constraining for the refiner. According to the invention, there are conducted simultaneously the steps of (a) the impregnation of the catalyst by a sulphur compound and (b) the reduction of the said catalyst. In addition, catalyst reduction takes place with the aid of an organic reducing compound, i.e. in the absence of fresh hydrogen. This is preferably carried out ex situ, i.e. outside the reactor, which means that the refiner need not carry this out himself and can instead arrange for its performance ex situ by a specialist in treatments, pretreatments or regenerations of catalysts. This operation is carried out in the absence of fresh hydrogen, so that the subsequent transportation by lorry, aircraft or boat from the pretreatment location to the use location is not subject to any explosion risk, because there is no residual hydrogen present in the catalyst pores. Finally, the catalyst user, i.e. generally the refiner, will have the thus pretreated catalyst in his reactor or reactors, i.e. in situ and can optionally carry out a reduction with hydrogen with the advantage of not then having to heat his catalyst to high temperatures and for long periods, such as are required when said pretreatment is not carried out. Thus, for example, a nickel catalyst reduced according to the prior art has to be treated in the presence of hydrogen at 400° C. for 14 hours, whereas in the case of the invention, the refiner only has to reduce his nickel catalyst with hydrogen at 300° C. and for only 3 hours.

According to the invention, it is not only possible to treat catalysts containing at least one metal chosen from the group constituted by cobalt, iron, molybdenum, tungsten and nickel, but also all catalyst types which have to be reduced before use and in particular catalysts for reforming, aromizing (R) and aromatizing hydrocarbons containing 2 to 12 carbon atoms per molecule and containing e.g. at least one noble metal from the platinum group and/or at least one metal from the rhenium, tin, gallium or similar group. The supports on which are deposited the metal or metals used can be amorphous supports (alumina, etc.) or crystalline supports (zeolites, etc.).

The invention is more particularly performed in the following way. Generally and preferably the catalyst is impregnated ex situ by a reducing compound and a sulphur compound. Working takes place in an aqueous solution, an organic solution or suspended in the aqueous or organic solution, at between 0° and 50° and preferably 10° and 40° C., but more particularly at ambient temperature. This impregnation is generally carried out by stirring the catalytic material with the solvent, the reducing compound and the sulphur compound using any appropriate means. For example, it is possible to use a rotary furnace of the louvre furnace type described in U.S. Pat. No. 4,551,437 or of the Louisville furnace type (described in European patent application 409 680.

The sulphur compound can either be elementary sulphur, e.g. in powder form (flowers of sulphur), or a mixture of elementary sulphur, e.g. in powder form (flowers of sulphur) and at least one organic polysulphide, such as described in the Applicant's U.S. Pat. No. 4,530,917, where it has the formula R—$S_{(n)}$—R', in which n is an integer from 3 to 20 and in which the radicals R and R', which can be the same or different, have in each case an organic radical containing 1 to 150 carbon atoms per molecule, said radicals being chosen from the group constituted by straight or branched, saturated or unsaturated alkyl radicals or radicals of the naphthene type, aryl radicals, alkyl aryl radicals and aryl alkyl radicals. R' can also represent the hydrogen atom, e.g. as an example of polysulphide reference can be made to ditert. dodecyl polysulphide (n=5) and ditert. nonyl polysulphide (n=5).

The sulphur compounds can also be constituted either by at least one organic or mineral sulphur optionally mixed with elementary sulphur, or at least one organic disulphide of formula HO—$R_1$—S—S—$R_2$—OH (in which $R_1$ and $R_2$ are organic radicals) and in particular diethanol disulphide or 2,2-dithiobis ethanol of formula HO—$C_2H_4$—S—S—$C_2H_4$—OH (often called D.E.O.D.S.). This disulphide can optionally be used mixed with elementary sulphur.

When using sulphur in powder form (flowers of sulphur), the latter is then used in suspension either alone or mixed with another sulphur compound (e.g. an organic polysulphide as defined hereinbefore) in exemplified weight proportions of 5 to 90% polysulphide and 95 to 10% elementary sulphur, but more particularly and in non-limitative manner 20 to 50% polysulphide and 80 to 50% elementary sulphur.

The reducing organic compound is advantageously chosen from among the reducing compounds described in the Applicant's EP-B-303 525 and in particular aldehydes containing 1 to 14 carbon atoms per molecule (preferably 2 to 12), ketones or polyketones containing 3 to 18 (and preferably 3 to 12) carbon atoms per molecule, ethers and esters containing 2 to 14 (preferably 3 to 12) carbon atoms per molecule, alcohols or polyalcohols containing 1 to 14 (and preferably 2 to 12) carbon atoms per molecule and organic acids or polyacids containing 1 to 14 (and preferably 1 to 12) carbon atoms per molecule. As preferred compounds reference is made to formic acid HCOOH, methyl formate $HCOOCH_3$, ethyl formate $HCOO\ C_2H_5$, paraldehyde $(CH_3—CHO)_3$, acetaldehyde $C_2H_4O$, formaldehyde $CH_2O$, methyl alcohol, ethyl alcohol, acetic acid, etc.

When not operating in an aqueous suspension or solution, but instead in an organic suspension or solution, which is often preferable, the organic solvent used is preferably white spirits as defined in U.S. Pat. No. 4,530,917, but optionally it is possible to use any other adequate solvent such as an alcohol, polyalcohol, glycol or polyglycol.

When the aforementioned impregnation is ended, e.g. in the rotary furnace, a heat treatment of the catalyst material is performed e.g. at between 100° and 200° C., generally between 130° and 170° C. and more especially around 150° C., for 30 minutes to 3 hours and preferably for approximately 1 to 2 hours.

At this stage, the catalyst (whose initial activity was reduced by poisoning the most active sites) is ready to be delivered to the refiner or user, who will optionally carry out in situ a hydrogen reduction of the catalyst, e.g. for the nickel catalyst at between 250° and 350° C. for 2 to 4 hours and preferably between 280° and 320° C. for 2.5 to 3.5 hours.

According to the invention, it is advantageous to incorporate into the catalyst 0.05 to 10% and preferably 0.2 to 1% of sulphur, expressed by weight of sulphur based on the catalyst mass and 10 ppm to 100%, preferably 100 ppm to 50% and more particularly 1000 ppm to 10% by weight of reducing compound based on the catalyst mass. Optionally, at the end of this process, the catalyst can undergo an in situ hydrogen reduction, i.e. in the reaction zone provided for the use of the said catalyst.

The process can be applied to the treatment of a catalyst based on at least one oxide of an active metal (deposited on an amorphous or crystalline matrix), whose activity is to be reduced by poisoning at least part of its active sites and during which ex situ transformation takes place of most of the said metal oxide into a metallic element. At the end of the process the in situ reduction of the catalyst is continued in the presence of hydrogen at a temperature and for a time lower than the temperature and time which would have been necessary if the two-stage process according to the invention had not been carried out.

The process can also be applied to a ex situ treatment of a catalyst based on at least one active metal (deposited on an amorphous or crystalline matrix), whose activity is to be reduced by poisoning at least part of its active sites and at the end of which the in situ reduction of the catalyst is continued in the presence of hydrogen.

Example 1

Test 1

2 alumina-based catalyst batches were prepared and 6% by weight (expressed as metal) of nickel oxide were deposited thereon.

A first batch 1 of 100 g of catalyst is impregnated with 0.48 g of DEODS (diethanol disulphide) containing 42.6% by weight sulphur, mixed in 42 $cm^3$ of a 15% formic acid aqueous solution (porous volume: 0.42 ml/g of catalyst).

A second batch 2 of 100 g of the same catalyst was impregnated by 2.4 g of DEODS mixed in 42 $cm^3$ of 15% formic acid aqueous solution.

At the end of this first stage of the process according to the invention, each catalyst batch underwent a heat treatment at 150° C. for 1 hour. The analyses of the thus treated catalysts are given in Table Ia:

TABLE Ia

|  | S % | C % | Loss on ignition at 450° C. (%) |
|---|---|---|---|
| Batch 1 | 0.29 | 1.92 | 6.93 |
| Batch 2 | 0.80 | 2.03 | 15.20 |

This table confirms that a correct sulphur quantity has been fixed to the catalyst, that carbon and a little water remain on the catalyst and that the sulphur, carbon and loss on ignition quantities are of the same order of magnitude as those which can be obtained by the prior art processes incorporating sulphur e.g. by DMS.

Test 2

Two other batches 3 and 4 of the alumina-based catalyst were prepared and on same were also deposited 6% by weight (expressed as metal) of nickel oxide.

A batch 3 of 100 g of catalyst, similar to batch 1, but differing from the latter in that it is impregnated by 0.48 g of DEODS (diethanol disulphide) containing 42.6% by weight of sulphur, mixed in 42 $cm^3$ of a 15% methyl formate solution in a white spirit (porous volume: 0.42 ml/g of catalyst).

A batch 4 of 100 g of the same catalyst and similar to batch 2, but differing therefrom in that it is impregnated by 2.4 g of DEODS mixed in 42 $cm^3$ of a 15% methyl formate solution in white spirit.

As in the first test, following the first stage of the process according to the invention, each catalyst batch 3 and 4 underwent a heat treatment at 150° C. for 1 hour. The analyses of the thus treated catalysts are given in Table Ib.

TABLE Ib

|  | S % | C % |
|---|---|---|
| Batch 1 | 0.29 | 1.92 |
| Batch 2 | 0.80 | 2.03 |

This table also confirms that a correct sulphur quantity has been fixed to the catalyst, that carbon remains on the catalyst, the sulphur and carbon quantities being of the same order of magnitude as those which can be obtained by the prior art processes of incorporating sulphur e.g. by DMS.

Example 2

Batches 1 and 3 are used in comparison with an identical catalyst batch also containing 0.29% by weight sulphur, but introduced with the aid of DMS and hereinafter called the reference catalyst. In Example 2, the catalyst is tested with respect to two reactions:

1. The hydrogenation of aromatics (e.g. toluene conversion). A model reaction was chosen, which is constituted by the hydrogenation of toluene under the following conditions:

| | |
|---|---|
| toluene | 10% by weight in heptane |
| temperature | 70° C. |
| pressure | 30 bar |
| LHSV (liquid hourly space velocity) | 2 liters of charge per liter of catalyst and per hour. |

2. The hydrogenation of diolefins measured in a steam cracking reaction by varying the MAV (maleic anhydride value) characteristic of the diolefin content under the following conditions:

| | |
|---|---|
| pressure | 30 bar |
| LHSV | 8 |
| T | 100° C. |
| MAV of charge | 87 (maleic anhydride value characteristic of the diolefin content). |

The results are given in Table II, following the reduction of the reference catalyst by hydrogen at 400° C. for 14 hours and after reducing the catalyst (initially pretreated, i.e. prereduced according to the invention) with hydrogen for 3 hours for batch 1 and for 2 hours 50 minutes for batch 3 at different temperatures (200°, 250° and 300° C.).

TABLE II

| | T° reduction °C. (with hydrogen) | % by weight toluene conversion | MAV product obtained |
|---|---|---|---|
| Reference catalysts | 400° C. for 14 hours | 4 | 40 |
| Catalysts pretreated according to the invention. Batch 1 | 200° C. for 3 hours | 0 | 69 |
| | 250° C. for 3 hours | 0 | 47 |
| | 300° C. for 3 hours | 0 | 40 |
| Batch 3 | 200° C. for 2 h 50 min. | 0 | 69 |
| | 250° C. for 2 h 50 min. | 0 | 47 |
| | 300° C. for 2 h 50 min. | 0 | 40 |

In this example, the optimum operating conditions were determined (in this case 300° C. for 3 hours for batch 1 and 2 hours 50 min. for batch 3), so that at the end of hydrogen reduction using the pretreatment catalyst, i.e. prereduced according to the invention, the same low diolefin contents are obtained with a non-pretreated catalyst reduced in the conventional manner in the presence of hydrogen for 14 hours at 400° C. Thus, the invention makes it possible to reduce the catalyst with hydrogen for a shorter time and at a lower temperature than a catalyst not pretreated according to the invention and even for a slightly shorter time with the catalyst of batch 3 than with that of batch 1. In batch 1, DEODS is in a formic acid aqueous solution, whereas in batch 3 it is in a methyl formate organic solution.

Example 3

Batches 1 and 2 are used in comparison with an identical catalyst batch containing 0.80% by weight sulphur, but in which the sulphur has been introduced with the aid of DMS and referred to hereinafter as the reference catalyst.

In Example 3, the catalysts which have a good inhibition of the hydrogenating activity of aromatics were tested in steam cracking petrol hydrogenation. The test was performed under the following conditions:

| | |
|---|---|
| Pressure | 30 bar |
| LHSV | 8 |
| Temperature | 100° C. |

The charge was an industrial steam cracking petrol. The results are given in Table III. The MAV (maleic anhydride value) indicates the olefin content and the $I_{Br}$ (bromine value) the olefin content.

| | |
|---|---|
| Charge: | MAV = 106 |
| | $I_{Br}$ = 46.5 (olefin content) |
| | S = 46 ppm |

TABLE III

| | | S | REDUCTION | MAV OF PRODUCT | $I_{Br}$ OF PRODUCT |
|---|---|---|---|---|---|
| Reference catalyst | | 0.8 | 400° C. for 15 h (reduction with hydrogen) | 3 | 41.2 |
| Catalyst pretreated according to the invention | Batch 1 | 0.29 | 300° C. for 4 hours | 3 | 41.5 |
| | Batch 2 | 0.80 | 300° C. for 4 hours | 3 | 47.6 |
| | Batch 3 | 0.29 | 300° C. for 4 hours | 3 | 41.6 |
| | Batch 4 | 0.80 | 300° C. for 4 hours | 3 | 47.7 |

Thus, when working with catalyst pretreated according to the invention (batches 1 and 3 with 0.29% sulphur) and then reduced with hydrogen for 4 hours at 300° C., the results are equivalent to those obtained with a 0.8% S catalyst, not pretreated according to the invention and reduced with hydrogen at 400° C. for 15 hours.

In addition, when working with catalysts pretreated according to the invention (batches 2 and 4 with 0.80% sulphur) and then reduced with hydrogen for 4 hours at 300° C., by comparison with the reference catalyst not pretreated according to the invention and then treated with hydrogen for 15 hours at 400° C., not only is there no affect on the olefins present in the charge, but their quantity is slightly increased.

Example 4

The production of a batch similar to batch 4 is repeated replacing DEODS by an equivalent sulphur stoichiometric quantity of a 50:50 by weight mixture of flowers of sulphur and ditert. dodecyl polysulphide suspended in 42 cm³ of a 15% methyl formate solution in a white spirit. Substantially the same results as with batch 4 were obtained on repeating the steam cracking petrol hydrogenation test of Example 3.

We claim:

1. A process for the pretreatment of a petrochemical or refining catalyst containing at least one metal in metallic or metallic oxide form and deposited on a support, comprising the following steps:
   a) firstly, impregnating said catalyst with an aqueous or organic solution, or an aqueous or organic suspension containing (i) at least one organic reducing agent selected from the group consisting of formic acid, ethyl formate and methyl formate and (ii) a sulphur-containing agent selected from the group consisting of diethanol disulfide or a mixture of diethanol disulfide with elemental sulfur,
   b) secondly thermally treating resultant impregnated catalyst.

2. A process according to claim 1, wherein step (a) is performed in an aqueous or organic solvent or in a mixture of aqueous and organic solvents and wherein step (b) is performed at between 100° and 200° for between 30 minutes and 3 hours.

3. A process according to claim 1, wherein during step (a), onto the catalyst are introduced by weight based on said catalyst 0.05 to 10% of the sulphur-containing agent, expressed as sulphur, and 10 ppm to 100% of the reducing agent.

4. A process according to claim 3, wherein onto the catalyst are introduced 0.2 to 1% of said sulphur agent, expressed as sulphur, and 100 ppm to 50% of said reducing agent.

5. A process according to claim 1, wherein the sulphur-containing agent is diethanol disulfide and the reducing agent is formic acid.

6. A process according to claim 1 performed in an organic solvent.

7. A process according to claim 6, wherein said solvent is white spirits.

8. Process according to claim 1, wherein the sulphur-containing agent is diethanol disulfide and the reducing agent is ethyl or methyl formate.

9. A process according to claim 1, further comprising reducing resultant thermally treated impregnated catalyst with hydrogen for about 3 hours at 200°-300° C.

10. A process according to claim 5, further comprising reducing resultant thermally treated impregnated catalyst with hydrogen at 300° C. for about 3 hours.

11. A process according to claim 7, further comprising reducing resultant thermally treated impregnated catalyst with hydrogen for about 3 hours at 300° C.

12. A process according to claim 9, wherein said metal is nickel.

13. A process according to claim 10, wherein said metal is nickel.

14. A process according to claim 11, wherein said metal is nickel.

* * * * *